United States Patent [19]

Garg

[11] Patent Number: 6,048,577
[45] Date of Patent: Apr. 11, 2000

[54] NANO-SIZED ALPHA ALUMINA PARTICLES HAVING A SILICA COATING THEREON

[75] Inventor: Ajay K. Garg, Northborough, Mass.

[73] Assignee: Norton Company, Worcester, Mass.

[21] Appl. No.: 08/191,737

[22] Filed: Feb. 4, 1994

Related U.S. Application Data

[63] Continuation of application No. 07/831,588, Feb. 5, 1992, abandoned.

[51] Int. Cl.[7] .................................. B05D 7/00; B32B 9/00; C09G 1/00
[52] U.S. Cl. ................................ 427/215; 428/404; 106/3
[58] Field of Search ................... 106/3; 423/625, 423/274; 501/12, 128; 427/215; 428/404

[56] References Cited

U.S. PATENT DOCUMENTS

| | | |
|---|---|---|
| 3,370,017 | 2/1968 | Bergna et al. ............... 252/309 |
| 4,012,337 | 3/1977 | Mitchell, III ............... 423/625 |
| 4,019,914 | 4/1977 | Esper et al. ............... 423/625 |
| 4,062,693 | 12/1977 | Berger ....................... 428/404 |
| 4,172,809 | 10/1979 | Triki ........................ 423/628 |
| 4,623,364 | 11/1986 | Cottringer et al. ........ 51/309 |
| 4,657,754 | 4/1987 | Bauer et al. ............... 423/625 |
| 4,737,411 | 4/1988 | Graves, Jr. et al. ....... 428/404 |
| 4,786,555 | 11/1988 | Howard, Jr. ............... 428/404 |
| 4,818,515 | 4/1989 | Ceresa et al. .............. 423/625 |
| 4,956,015 | 9/1990 | Okajima et al. ............ 106/3 |
| 4,997,461 | 3/1991 | Markhoff-Matheney et al. ....... 51/293 |

FOREIGN PATENT DOCUMENTS 2236525  10/1991  United Kingdom .

*Primary Examiner*—Steven Bos
*Attorney, Agent, or Firm*—David Bennett

[57] ABSTRACT

Nano-sized powders of alpha alumina can be obtained from a boehmite gel doped with a barrier-forming material such as silica that is then dried, fired and comminuted to powder form.

10 Claims, 5 Drawing Sheets

200nm

50nm

50nm

NANO-SIZED ALPHA ALUMINA PARTICLES HAVING A SILICA COATING THEREON

This is a continuation of copending application Ser. Number 07/831,588 filed on Feb. 5, 1992, now abandoned.

BACKGROUND OF THE INVENTION

This invention relates to alpha alumina powders and specifically to alpha alumina powders with a number average particle width below 50 nanometers, (termed for brevity "nano-sized" particles) and to a method of making such powders. In discussing the "width" of such particles hereafter it is to be understood that, except where the context clearly indicates the contrary, it is intended to refer to the number average value of the largest dimension perpendicular to the longest dimension of a particle. The measurement technique is based on the use of a transmission electron microscope, (a JEOL 2000SX instrument).

Alpha alumina is the hardest and densest form of alumina and is formed by heating other forms of alumina or hydrated alumina at elevated temperatures. It is therefore the form of alumina that is best adapted to abrasive or ceramic applications.

Alpha alumina is conventionally formed by a fusion process in which an alumina hydrate is heated to above about 2000° C. and then cooled and crushed. Heating at these high temperatures causes the crystals of alpha alumina to grow to several microns and to sinter together to produce an extremely hard material. The high density and the hardness of the alumina particles produced in this way make the crushing process very difficult. To get small particles, it is necessary to break the sinter bonds and, if even smaller particles are needed, perhaps of the order of a few microns or less in size, even to crush the primary crystals themselves. This is of course an extremely difficult task requiring much expenditure of energy. While the sinter bonds are very difficult to break, especially when sintering to essentially theoretical density has occurred, the fracture of the ultimate crystals themselves is even harder.

Recently the development of sol-gel, and particularly seeded sol-gel, processes have permitted the production of alumina with a microcrystalline structure in which the size of the ultimate crystals, (often called microcrystallites), is of the order of 0.1 micron. Such seeded processes incorporate seed particles that are capable of nucleating the conversion of boehmite, (alpha alumina monohydrate), to the alpha alumina phase at relatively low temperatures. The nature of the seed particle in terms of its crystal shape and lattice dimensions should be as close as possible to that of the target material for the nucleation to be efficient so that the logical choice is alpha alumina itself.

Virtually as soon as the alpha phase is generated, in the form of particles comprising microcrystallites of alpha alumina less than one micron in size, there is a tendency for the particles to sinter together where they contact one another. This tendency accelerates with increasing temperature. Keeping the temperature of formation of the alpha phase low therefore minimizes the degree to which the particles are sintered together and thus makes crushing to the ultimate particles size somewhat easier.

In U.S. Pat. No. 4,657,754, Bauer et al. teach firing a dried seeded sol-gel alumina to convert at least a portion to the alpha phase and then crushing the dried product to a powder of alpha particles, taking care not to cause excessive sintering or particle growth during the firing. This ensures that little sintering will have taken place. Thus the crushing will need to break only a few sinter bonds and no ultimate particles. Firing to complete the conversion can then be undertaken with the product already in its powder form. This is still a difficult and expensive operation however and limited essentially by the size of the ultimate particles of alpha alumina in the product, (100 nm).

Finer crystallites can of course be obtained by the use of finer seed particles. If the size of the seed particles is of the order of 0.1 micron then the final product obtained will have a crystal size of about a micron or a little less. To obtain smaller crystals, it is necessary to use smaller seeds. It is apparent therefore that there is a need for alpha alumina seed particles that are nano-sized so as to drive down the microcrystallite size of seeded sol-gel aluminas and yield the optimum products available from this technology.

The use of fine alpha alumina powder is also important in the production of formed ceramic articles or monoliths. In such a process a fine alumina powder is heated until the particles sinter together and form a solid body. This can be done by heating the powder compressed into the desired form under pressure, as in a hot isostatic pressure, (or HIP), operation or simply by heating a cold pressed powder in the form of the desired object. Clearly the smaller the powder particles the easier the sintering process. Thus in this field too there is a demand for powder that is as fine as possible.

Besides being used as a material from which ceramic monoliths or abrasive grits are formed, fine alpha alumina powder is widely used as a polishing, or lapping abrasive. In such lapping applications, the finer and more uniform the particle size of the powder, the better the finish that can be attained. Fine alpha alumina powder is also used to modify the frictional characteristics of materials as diverse as magnetic tapes and cardboard. In most of such applications, especially those where uniformity and fineness are desirable, nano-sized alpha alumina powder would be a highly desirable commodity.

Another significant market for nano-sized alumina is in the formulation of catalyst supports for high temperature catalytic operations.

One of the problems in working with a boehmite gel to produce formed ceramic articles is that the gel cannot exceed about 65 wt % solids because of the porous nature of the boehmite particles. Thus there is a lot of water that needs to be driven off in the course of the drying process. In addition not only is there further shrinkage as a result of the elimination of the water associated with the boehmite, (which is of course alpha alumina monohydrate), but the phase change from the intermediate gamma phase (to which the boehmite first converts) to the final alpha phase also involves a shrinkage. Thus the direct fabrication of a ceramic product from boehmite is only practical for thin objects where the water loss can be relatively easily be accommodated and the shrinkages can be controlled.

If alpha alumina in very fine form could be formed into a gel, it would be possible to form objects from the gel and then fire them to eliminate only the water associated with the gel without concern for the volume changes that would accompany changes of phase. The production of nano-sized alpha alumina poeders would make this objective a feasible proposition.

There is therefore a need to develop techniques for producing extremely fine alpha alumina powders that do not involve huge energy expenditures for crushing operations and which open up a wide range of potential new uses for such products.

The present invention provides a process that is adapted to provide alpha alumina in an extremely fine form that is very useful in a wide range of applications. The process is much more economical than prior art techniques and results in a much finer product than hitherto available that is of great versatility and value.

The invention also provides alpha alumina with a very uniform particle size in the nanometer range with a wide spectrum of potential applications.

DESCRIPTION OF THE INVENTION

The process of the present invention comprises dispersing in a boehmite gel a material that forms a barrier around the boehmite particles, at a temperature below that at which boehmite converts to alpha alumina, said material being incorporated in an amount sufficient to inhibit particle size growth after formation of alpha alumina from the boehmite, then drying and firing the gel at a temperature to convert at least the major proportion of the alumina to the alpha phase in the form of loose aggregates of ultimate particles with sizes from about 20 to about 50 nanometers.

These aggregates are described as "loose" by which is meant that they can be relatively easily comminuted to recover the primary particles which have a width that is less than about 50 nanometers.

The firing should not be at a temperature to cause significant growth or over-sintering of the particles, (which would of course cause them to be extremely difficult, if not impossible, to separate to the primary particles). In fact the barrier coating makes the sintering of such products occur only at an elevated temperature of about 1400° C. or higher and the usual firing temperature employed is about 1300° C.

The barrier material is believed to form a very thin coating around the particles of boehmite in the gel which inhibits migration of alumina across the particle boundary and thus prevents, or at least significantly inhibits, growth of the particle as it is converted to the alpha phase. The result is therefore the formation of alpha alumina particles with sizes of the order of those in the originating boehmite gel. The barrier material is conveniently a glass.

The preferred glass forming barrier material is most conveniently silica but other glass forming materials capable of acting in the above way are within the purview of the present invention. These could include boron containing materials such as borosilicates and the like. For the purposes of this description, the primary emphasis will be on the most readily available and easily usable materials based on silica.

When silica is used as the barrier material, the amount incorporated is preferably from about 0.5 to about 5% by weight based on the weight of the alumina in the gel. It is usually preferred to disperse the silica in a sol or a gel of the boehmite so as to maximise the intimacy of the dispersion between the components.

The boehmite can be any of those currently available which have dispersed particle sizes of the order of a few tens of nanometers or less. Clearly the boehmites with the most consistently fine particles sizes are preferred since these do not have the hard-to-disperse agglomerates that characterize some of the other commercial products.

It appears that the silica interacts with the surface of the boehmite particles, probably by formation of a glass, and this slows their conversion to alpha alumina and the subsequent growth of these alpha particles. Because of this particle growth suppression mechanism there is little reason to keep the temperature low. Thus more rapid conversion can be obtained using higher temperatures without adverse effect on the alpha crystal size.

Addition of the silica to a boehmite sol and the gelation of the sol mixture obtained is an important preferred feature of the present invention since this permits a complete and uniform dispersion to be achieved. In addition the silica becomes attached to the essentially colloidal sized boehmite particles which are inhibited from significant further growth. In this way it is possible to ensure that a powder with a highly-uniform, very fine particle size is obtained.

When the conversion to alpha has occurred the particles are in the form of loose agglomerates of primary particles with a width of about 50 nanometers or less and may appear under a scanning electron microscope to have the form of a series of rod-shaped or cluster agglomerates, or sometimes a rough network of elements comprising the primary particles. These loose agglomerates or aggregates are relatively easily broken down to the individual particles, for example by wet or dry milling. They are relatively easily broken up because of the formation of a silica-containing barrier phase at the crystal boundaries which inhibits the formation of a sinter bond between alpha alumina ultimate particles. This results in a product with a number average particle width of less than about 50 nanometers. A wet milling process can often lead to the formation of a minor amount of hydrated alumina, for example alumina trihydrate, by surface hydrolysis of the alpha alumina. Such hydrates will revert to alpha alumina upon firing of course and for the purposes of this specification, such surface modified alpha alumina is not distinguished from unmodified alpha alumina.

The process of the invention leads to the production of alpha alumina particles of a novel, fine, uniform particle size. Prior art alpha alumina powders milled to give a high BET surface area are found to comprise a wide range of particle sizes to the extent that these often appear to be in a bimodal distribution. The present invention therefore also provides a fine alumina powder having a BET surface area of at least 50 $m^2$/gm. and preferably at least 100 $m^2$/gm., in which at least 80% of the powder weight and at least about 95% of the total alumina phase weight is provided by particles of microcrystalline alpha alumina, and wherein at least 95% of the particles have widths of from about 20 to about 50 nanometers and less than 5% have ultimate particle widths greater than 100 nanometers. The fraction of these large particles is measured by a transmission electron microscope analysis of an ultramicrotomed sample and an assessment of the percentage of the total field occupied by particles, occupied by particles having ultimate particle widths greated than 100 nanometers. The balance of the powder weight is largely provided by the barrier material which, as indicated above, can be any material capable of inhibiting particle growth and/or sintering during the conversion to alpha alumina. Where the barrier comprises a silica-containing material such as a mullite this can represent as much as 15% by weight of the total weight or even more. Usually however, operating with the preferred minor amounts of silica sol specified above, the alpha alumina represents about 95% of the weight of the powder.

It is also possible that the above "up to 20%" of non-alpha alumina in the final powder may be provided in part by alumina phases intermediate between the boehmite and alpha phases, such as gamma alumina.

The amount of silica present should be carefully controlled because if too much is added there will be a tendency to react with the bulk of the alumina and much of the final product will have the relatively useless chemical composition of mullite or other silica-containing phase. On the other hand too little will not be effective to limit alpha particle growth. In practice it is found that an amount from about 0.5 to about 8, and preferably from about 1 to about 5 wt. % of the solids content of the gel should be silica. Generally it is preferred that the amount of silica-containing phase in the final product should be less than about 20 wt % and preferably should be less than about 10, and most preferably less than about 5 wt %.

The silica can be added in the form of colloidal silica, a silica sol or a compound that under the reaction conditions will liberate such a colloid or sol and form a glassy coating around the alumina particles. Such compounds could include organosilanes such as tetraethyl orthosilicate, and certain metal silicates. Generally alkali metal silicates are less preferred. The form of the silica in the sol should preferably be of a particle size that is at least similar to, or preferably smaller than, that of the boehmite, that is, of the order of a few nanometers at most.

Adding the silica in the form of a sol to the boehmite sol ensures the most uniform and effective distribution of the silica such a minimum amount can be used.

The gel may be dried at lower temperatures before it is calcined, which is commonly done at a temperature of about 700° C., over a period of several hours. The calcination drives off the water in the gel, promotes formation of the glassy surface barrier and begins conversion of the boehmite to the gamma alumina phase. The calcination process can however be carried out under other conditions with higher or lower temperatures if desired, or even omitted altogether.

Firing of the dried gel can occur under any conditions that will bring about an essentially complete phase conversion to alpha alumina. Generally unseeded boehmite will convert to the alpha phase at temperatures of from about 1100 to 1300° C. with the time to accomplish the conversion decreasing with increasing temperature. In the present invention the preferred firing temperature is from about 1200° C. to 1400° C. and the time taken at that temperature will be somewhat longer than would be usual for such aluminas due to the presence of the silica. The firing may require as much as 40 hours at the lower end of the temperature range and as little as one minute at the upper end of this range. It is preferred to operate at the lower end of the range such as from about 1200 to about 1300° C. so as to minimize the tendency for the particles to form aggregates. In this temperature range, a time at the firing temperature of from about 1 minute to about 40 hours is needed to reach the desired level of conversion to alpha alumina without formation of excessive amounts of intractable (as opposed to loose), agglomerates.

In firing, the time at the firing temperature is very important. A slow ramp-up to the firing temperature may dictate the use of a shorter time at the firing temperature and this ramp-up is often a function of the equipment used. Generally a rotary furnace needs a much shorter time to reach the desired temperature while a box furnace can take a significantly longer time. Thus for reasons of control and reproducibility it may often be preferred to use a rotary furnace. In addition a large sample will need longer to reach a uniform body temperature than a smaller one. The temperature/time schedule actually used will therefore be dictated by the circumstances, with the above considerations in mind.

Comminution can be accomplished in a mill using conventional techniques such as wet or dry ball milling or the like. Alternatively it is possible to take advantage of presence of mullite or other aluminosilicate phases at the particle boundaries within the agglomerates to make comminution easier. Such phases will usually have different thermal expansion properties from alpha alumina and it is often possible to rupture such boundary layers by cycling the product through high and low temperatures to create expansion stresses. Such stresses may sometimes themselves be adequate to bring about comminution. It may also be possible to subject these silica-containing boundaries to chemical stresses by a hydrothermal treatment or by treating the product with a base or an acid. More commonly however such thermal or chemical comminution will need to be followed by some sort of physical comminution to complete the breakdown to a powder with a number average particle width of less than 50 nanometers.

The very fine particle sizes obtained by the process of the invention are believed to be unique in that they combine a high surface area in excess of 50, and more often 120 $m^2$/gm. with a particle size distribution such that less than about 5% by weight of the particles have an ultimate particle size greater than 100 nm. Since milling is typically done using low purity alpha alumina media, it is believed that any 100 nm± particles observed are more likely derived from attrition of the media and not from alpha alumina obtained by the conversion of the boehmite. By contrast products obtained by milling larger alpha alumina particles typically have a much wider spread of particle sizes with large number of particles greater than 100 nm in size.

BRIEF DESCRIPTION OF THE DRAWINGS

The attached drawings illustrate the advantages of the present invention over alpha alumina powders produced by comminution of alpha alumina powders of the prior art by means of transmission electron microscope photographs of ultramicrotomed specimens.

DESCRIPTION OF PREFERRED EMBODIMENTS

The invention is now further described with reference to the following Examples which are intended for the purposes of illustration only and should not be taken as implying any necessary limitation on the essential scope of the invention.

EXAMPLE 1 (COMPARATIVE)

Figure 2:
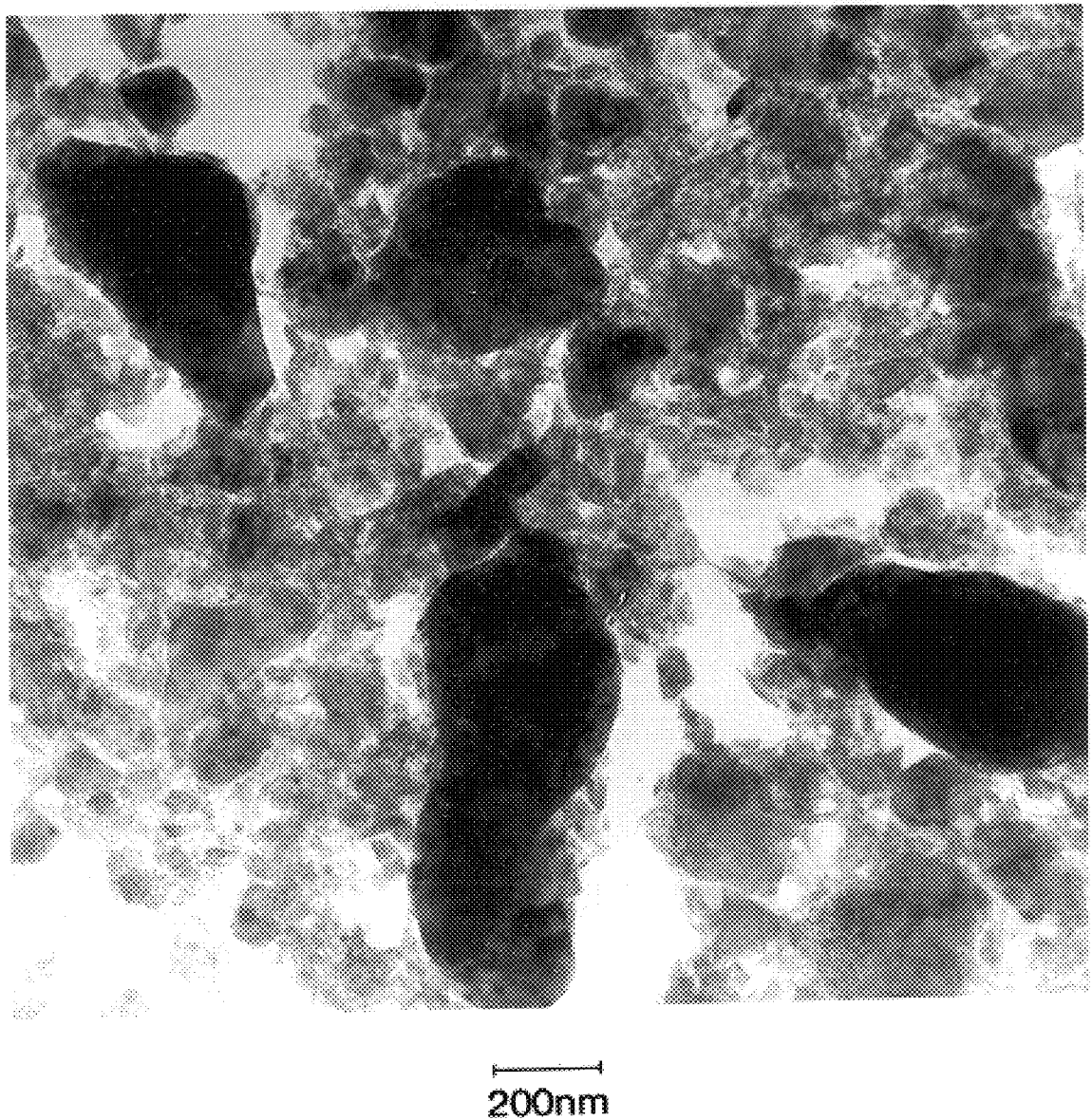
FIG. 2 shows the best commercial fine alumina powder currently available, (A-16SG from Alcoa Co.), milled to a surface area of about 124 $m^2$/gm using conventional techniques. As can be seen the particles appear to have a bimodal distribution with some very small particles and a large proportion of particles with sizes over 100 nm. This wide particle size range leads to unsatisfactory results when such powders are used in very demanding lapping or polishing applications.

A commercial submicron alpha alumina powder, (100 lb of Alcoa Co. A-16SG), was milled with 1700 lb of water in a Sweco M-80 mill filled with ½" "Diamonite" low purity alumina media for 50 hours to obtain a product with a BET surface area of 66 $m^2$/gm. which corresponds to a calculated average particle size of 22.7 nm. Milling was continued for a further 50 hours and the product was found to have a BET surface area of 124 m²/gm., corresponding to a calculated average particle size of 12.5 nm. Transmission electron microscopy of the product revealed the presence of a predominant weight fraction of single crystal alpha alumina particles with a size range of 100–200 nm. (See FIG. 2).

EXAMPLE 2

Figure 1:
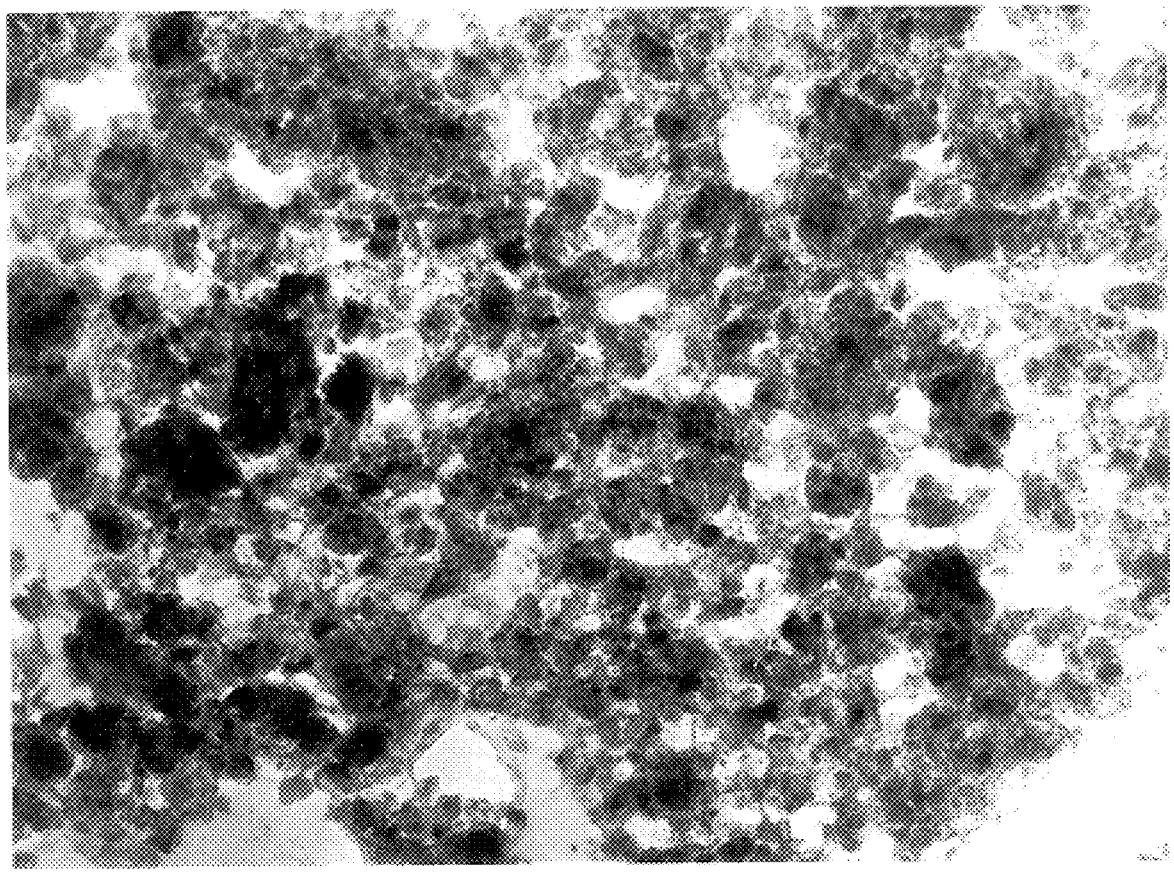
FIG. 1 shows a powder according to the invention. As can be seen it comprises highly uniform 20–50 nm particles with very few larger than 50 nm in width. Some appear to be loosely agglomerated but the individual particle structure is clearly visible.
Figure 3:
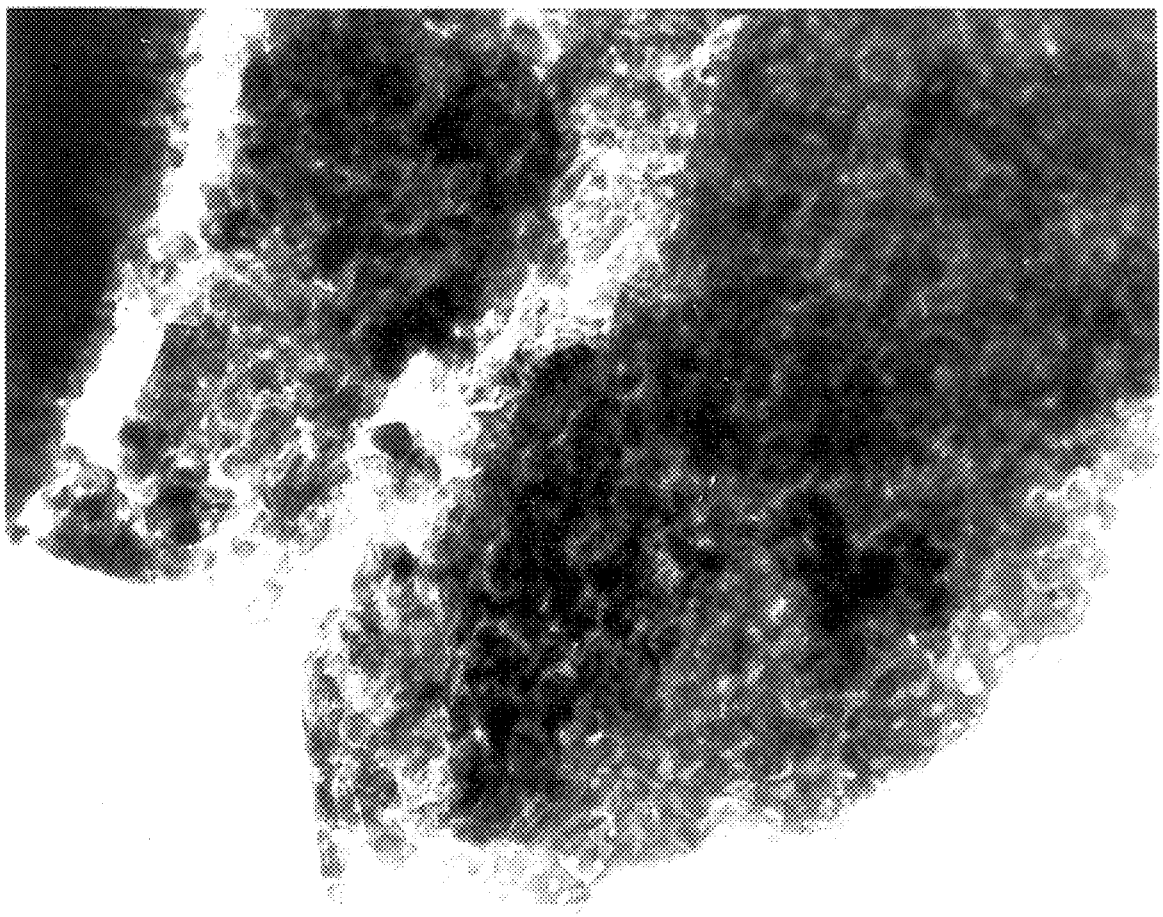
FIG. 3 shows the loosely agglomerated product obtained by firing the silica coated boehmite before milling to produce the separated particles, (shown in FIG. 1).
Figure 4:
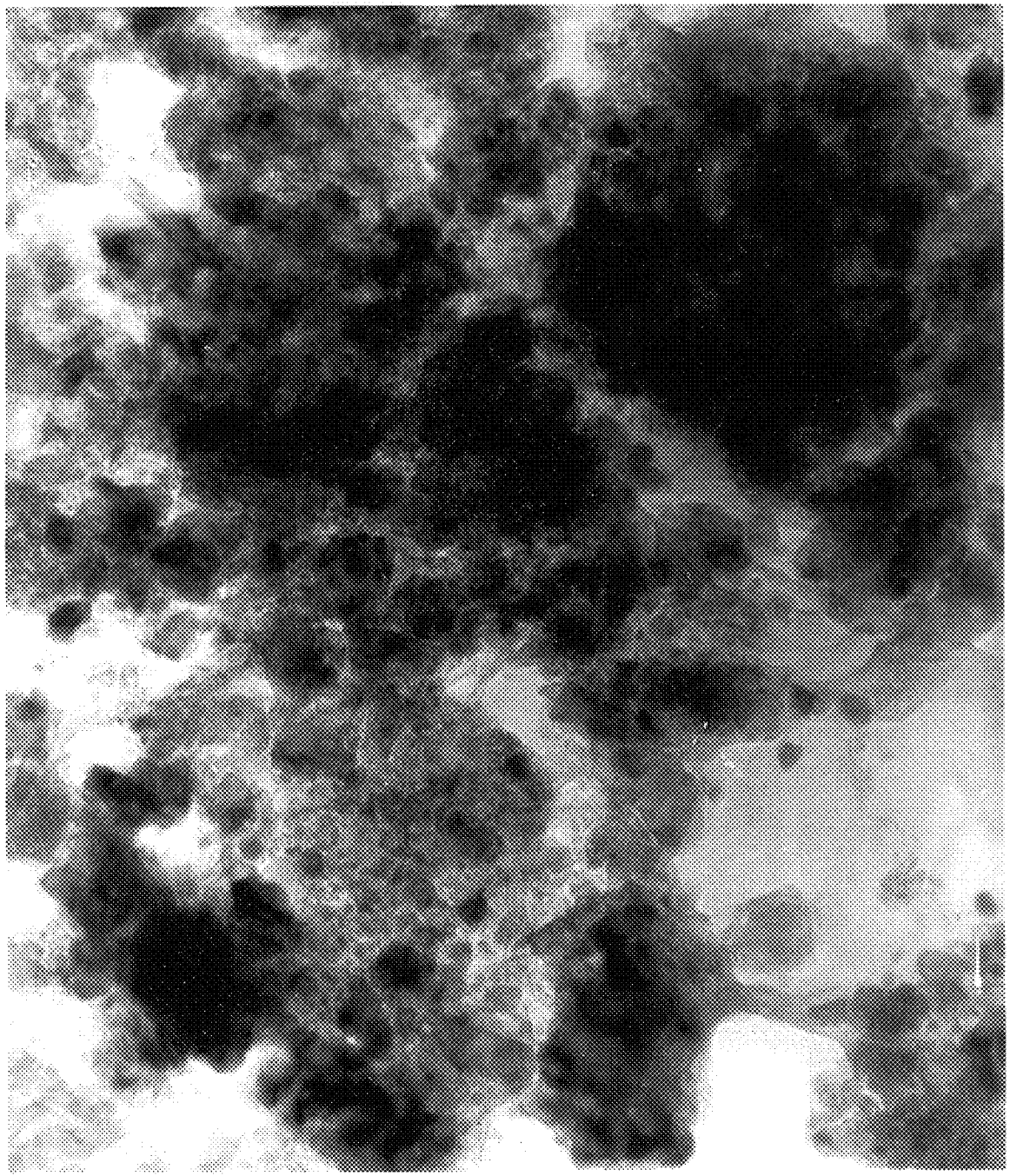
FIGS. 4 and 5 show the same materials as FIGS. 1 and 2 respectively, but at a higher magnification.
Figure 5:
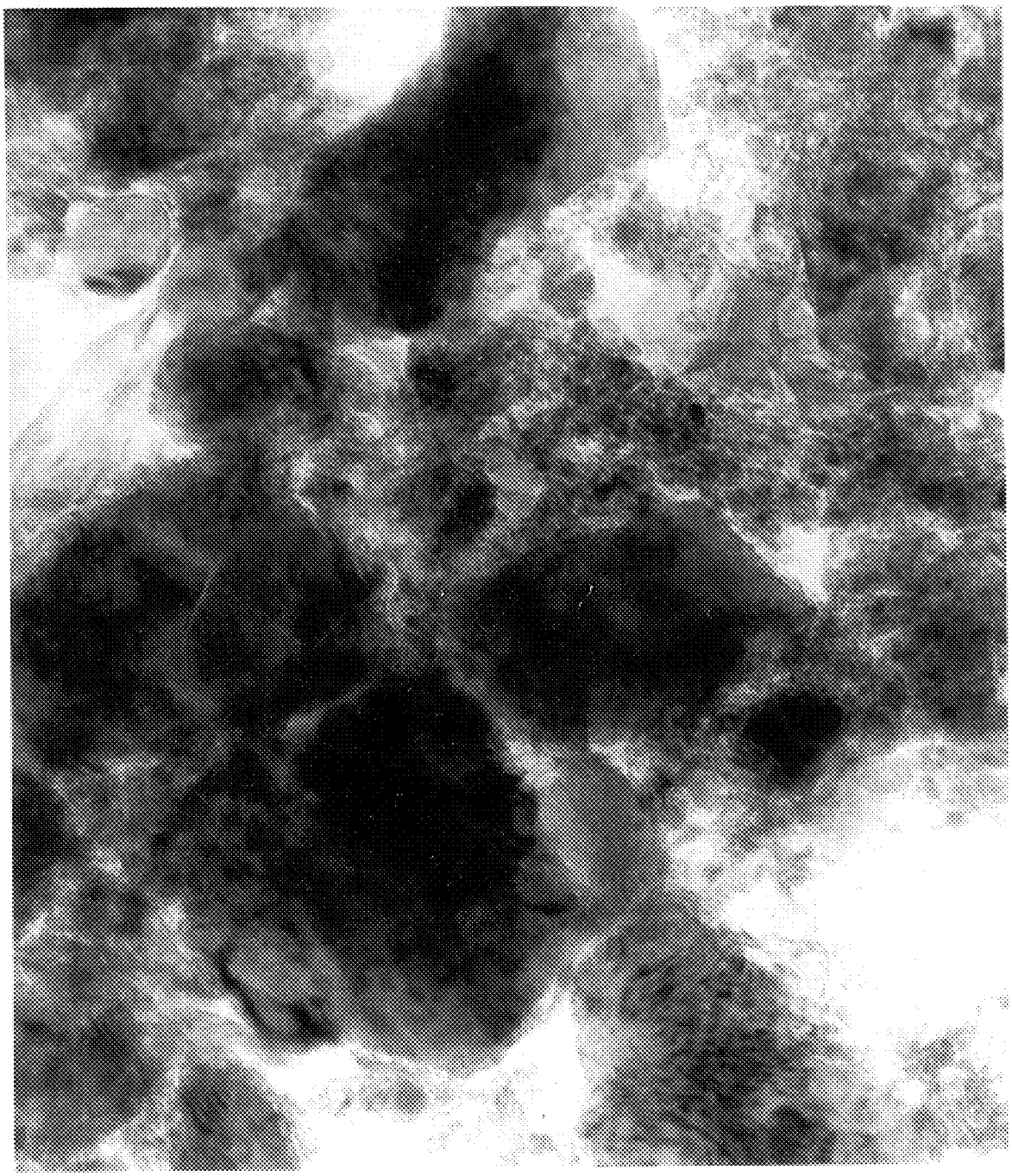

A sol of 132 lb of Condea "Pural-SB" boehmite, (particle size range from 30–100 nanometers as measured by photon correlation spectroscopy using a Malvern 4700C instrument), in 547 lb of water were doped with 5.93 lb of colloidal silica, (Nyacol 2034 DI containing 33% of silica). The silica particles had a 3 nm nominal size. The sol was gelled by addition of 36 lb of nitric acid (containing 22 wt % of acid). The resulting gel was dried at 195° C. and crushed to −50 mesh size. The crushed product was then fired in a rotary furnace at a rate of 3.5 lb/hr with an average residence time at the furnace temperature of 1300° C. of about 10 minutes. The fired powder had a silica content of 1.95 wt % and a BET surface area of 20 m²/gm. and no transitional phases of alumina were found using X-Ray diffraction crystallography. Transmission electron microscopy, (see FIG. 3), revealed aggregates of particles of alpha alumina with widths of from about 20 to about 50 nm. (See FIG. 3). This alpha alumina powder, (100 lb), was placed in the same mill used in Comparative Example 1 and milled with 1700 lb of water for 50 hours. At the end of this time the BET surface area was 120 m²/gm and a further milling for another ten hours produced a BET surface area of 133 m²/gm. Transmission electron microscopy of this product, (FIG. 1 of the Drawings), showed that substantially all of the particles had widths within the range of 20–50 nm and there was a substantial absence of particles over 100 nm. It will be appreciated therefore that the product of the invention was much more uniform in size and was produced much faster than the product of the prior art.

EXAMPLE 3

Silica doped boehmite gels were produced with silica contents of 1.5 wt % and 3.0 wt % respectively by essentially the technique described in Example 2. The 1.5% silica gel was fired at 1240° C., and the 3% silica gel was fired at 1260° C., each for 10 hours in a box furnace, to obtain essentially complete conversion to the alpha phase as determined by x-ray diffraction techniques. Each had the form of agglomerates of particles from about 20 to about 50 nm in size. These aggregates were broken up mechanically in a Sweco M-45 mill using a 10 lb powder charge with 200 lb of water. For comparison, a 10 lb powder charge of Alcoa A-16SG was also milled in the same equipment. The time for each to reach a BET surface area of 110 m²/gm was measured. The results were as follows:

| Powder Type | Milling Time |
| --- | --- |
| 1.5% silica | 66 hours |
| 3.0% silica | 65 hours |
| A-16SG | 100 hours |

In addition to the faster milling to reach this surface area, the uniformity of the particle size in the products according to the invention was much greater.

The applications of such nano-sized alpha alumina powders include the use as a very fine and uniform polishing abrasive and as seeds for conversion of boehmite to alpha alumina by a seeded sol-gel process. In addition however, with nano-sized alpha particles, it is possible to form shapeable, (eg. by extrusion), aqueous based dispersions, (called "alpha-gels") of high solids content, perhaps with the assistance of a surface active or gelling agent or a binder, and to use such dispersions to cast ceramics directly. Such alpha-gels could also be extruded into filaments for use as, for example, reinforcement in metallic composites, or be cut into filamentary abrasive particles or even comminuted to form more traditional abrasive particles.

In all such applications it is also possible to include in the boemite sol a minor amount of an oxide of magnesium, zirconium, titanium, or a rare earth metal oxide, or a precursor of such an oxide, to confer on the final alpha powder a specific property or enhanced property.

What is claimed is:

1. A process for the production of fine alpha alumina particles having a silica coating thereon which comprises dispersing silica in a gel of boehmite particles with a particle size less than about 100 nanometers in an amount that represents from about 0.5 to about 5 wt. % of the solids content of the gel, firing the resultant gel for a time and at a temperature sufficient to convert at least 80% by weight of the boehmite to alpha alumina in the form of loose agglomerates of primary particles but insufficient to cause the particles to become highly sintered, and thereafter comminuting the agglomerates of primary alpha alumina particles into a powder comprising individual particles of alpha alumina with particle widths of from about 20 to about 50 nanometers and a BET surface area of at least 50 m²/gm.

2. A process according to claim 1 in which the amount of silica added is from about 1 to about 3 wt % of the solids content of the gel.

3. A process according to claim 1 in which the silica is added in colloidal form.

4. A process according to claim 1 in which the gel is fired at a temperature and for a time sufficient to ensure that all alumina is converted to the alpha phase as indicated by the absence of any transition phase alumina by X-Ray diffraction analysis.

5. A process according to claim 1 in which the comminution is performed in a vibratory mill.

6. A fine alumina powder in which the individual particles of the powder have a silica coating, said powder having a BET surface area of at least 50 m²/gm in which at least 80% of the powder weight and at least 95% of the total alumina phase weight is provided by microcrystalline alpha alumina, and wherein at least 95% of the particles have ultimate particle widths of from about 20 to about 50 nanometers and less than 5% have ultimate particle sizes greater than 100 nanometers.

7. A fine powder according to claim 6 in which the silica coating around the alpha alumina particles represents from about 1 to about 20% of the weight of the powder.

8. A fine powder according to claim 6 in which the silica coating is present in an amount sufficient to provide from about 1 to about 3% by weight of the powder.

9. A polishing slurry comprising a powder according to claim 6 dispersed in a liquid dispersion medium.

10. A polishing slurry comprising a powder according to claim 7 dispersed in a liquid dispersion medium.

* * * * *